(12) United States Patent
Ye

(10) Patent No.: US 10,318,055 B2
(45) Date of Patent: Jun. 11, 2019

(54) TOUCH CONTROL PANEL AND FABRICATING METHOD FOR THE SAME, TOUCH CONTROL DISPLAY SCREEN

(71) Applicant: Wuhan China Star Optoelectronics Technology Co., Ltd., Wuhan, Hubei (CN)

(72) Inventor: Jian Ye, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 21 days.

(21) Appl. No.: 15/535,642

(22) PCT Filed: Mar. 29, 2017

(86) PCT No.: PCT/CN2017/078632
§ 371 (c)(1),
(2) Date: Jun. 13, 2017

(87) PCT Pub. No.: WO2018/152923
PCT Pub. Date: Aug. 30, 2018

(65) Prior Publication Data
US 2018/0373377 A1     Dec. 27, 2018

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
CPC ............... G06F 3/0416; G06F 3/044; G06F 2203/04103; G06F 2203/04111
See application file for complete search history.

(56) References Cited

U.S. PATENT DOCUMENTS

| 2015/0220183 A1* | 8/2015 | Youngs | G06F 3/044 345/173 |
| 2016/0034091 A1* | 2/2016 | Cheng | G06F 3/0412 345/174 |
| 2016/0299594 A1* | 10/2016 | Zhang | G06F 3/041 |

(Continued)

FOREIGN PATENT DOCUMENTS

| CN | 103914183 A | 7/2014 |
| CN | 105224116 A | 1/2016 |

*Primary Examiner* — Premal R Patel
(74) *Attorney, Agent, or Firm* — Andrew C. Cheng

(57) ABSTRACT

A touch control panel includes a substrate including a touch control region and a trace region. The substrate includes metal bridges on the touch control region and first traces on the trace region. The substrate is provided with an insulating layer covering the metal bridges and the first traces and has first via holes located on a position of the touch control region. Second via holes are located at positions corresponding to the first traces. The insulating layer is formed thereon with a metal layer including inductive electrodes on the touch control region and driving electrodes. The inductive electrodes and driving electrode are connected to second traces and the third traces. The second and third traces are connected to the first traces through the second via holes and inductive electrodes are electrically connected to the metal bridges through the first via holes.

13 Claims, 3 Drawing Sheets

(56) References Cited

U.S. PATENT DOCUMENTS

| | | | |
|---|---|---|---|
| 2016/0378233 A1* | 12/2016 | Huo | G06F 3/0412 |
| | | | 345/174 |
| 2018/0061898 A1* | 3/2018 | Oh | H01L 27/322 |
| 2018/0067597 A1* | 3/2018 | Kim | G06F 3/0412 |
| 2018/0088717 A1* | 3/2018 | Chen | G02F 1/13338 |
| 2018/0120977 A1* | 5/2018 | Shim | G02F 1/13338 |
| 2018/0143691 A1* | 5/2018 | Asai | G06F 3/016 |
| 2018/0182822 A1* | 6/2018 | Seo | G06F 3/0416 |
| 2018/0203538 A1* | 7/2018 | Li | G06F 3/044 |

* cited by examiner

TOUCH CONTROL PANEL AND FABRICATING METHOD FOR THE SAME, TOUCH CONTROL DISPLAY SCREEN

CROSS-REFERENCE TO RELATED APPLICATIONS

This application claims the benefit of the priority of Chinese Patent Application No. 2017101013074, entitled "Touch control panel and fabricating method for the same, touch control display screen", filed on Feb. 23, 2017, disclosure of which is incorporated herein by reference.

FIELD OF THE INVENTION

The present invention relates to a field of a touch screen technology, and more particular to a touch control panel and a fabricating method for the same, a touch control display screen.

BACKGROUND OF THE INVENTION

In-plane visible region electrodes of the conventional touch screen are transparent conductive etc. materials, the peripheral trace region is metallic material. Since the in-plane and peripheral conductive materials are distinct materials, their productions need to be separated independently from each other; and conventional single-layer conductive layer touch screen is based on Metal Mesh process, since the in-plane and peripheral traces all are the same metal layer, and they commonly need twice productions for metal layer touch control/driving electrodes and metal bridges; and the peripheral traces have only one metal conductive layer with a higher impedance.

SUMMARY OF THE INVENTION

The present invention provides a touch control panel and a fabricating method, which decreases peripheral trace impedance, and effectively reduces fracture risk of peripheral traces.

The present invention further provides a touch control display screen.

In the present invention, said touch control panel comprises a substrate which is disposed with a touch control region, and a trace region located on an edge of the touch control region, said substrate is disposed thereon with metal bridges located on said touch control region and a plurality of first traces located on said trace region, said substrate is further formed thereon with an insulating layer covering said metal bridges and traces, said insulating layer is disposed with a plurality of first via holes located on a position of the touch control region, and second via holes are located at positions corresponding to each of the first traces, said insulating layer is formed thereon with a metal layer which comprises a plurality of inductive electrodes located on the touch control region, and a plurality of driving electrodes, the inductive electrodes are connected to second traces located on the trace region, the driving electrodes are connected to third traces located on the trace region, the second traces and the third traces are respectively correspond to positions of the first traces, and said second and third traces all are connected to said corresponding first traces through said second via holes, said plurality of inductive electrodes are electrically connected to said metal bridges through said plurality of first via holes.

Meanwhile, a number of said second via holes are intervally disposed along an extending direction of each of said first traces on said insulating layer.

Meanwhile, each of said first via holes is located between corresponding adjacent two of the inductive electrodes which are separated apart from each other by said driving electrode.

Meanwhile, said plurality of inductive electrodes are arranged in matrix, said plurality of driving electrodes are arranged in matrix, and said plurality of inductive electrodes and a number of the driving electrodes are intersected and insulated with each other in distribution thereof.

In the present invention, the fabricating method for said touch control panel, comprises steps of:

forming the metal bridges on the touch control region of the substrate while forming the plurality of first traces on the trace region of the substrate;

forming the insulating layer covering said metal bridges and said first traces;

on said insulating layer, forming the plurality of first via holes at positions corresponding to said touch control region, forming the second via holes at positions corresponding to each of said first traces; and on said insulating layer, forming the plurality of inductive electrodes, the plurality of driving electrodes, and the second traces and the third traces corresponding to positions of the first traces, and making said inductive electrodes being connected to said metal bridges through the corresponding first via holes; and connecting the second traces and the third traces to the corresponding first traces through the second via holes.

Meanwhile, said insulating layer is provided thereon with a number of said second via holes intervally disposed along an extending direction of each of said first traces.

Meanwhile, each of said first via holes is formed between corresponding adjacent two of the inductive electrodes separated apart from each other by said driving electrode.

Meanwhile, said step of forming the metal bridges on the touch control region of the substrate while forming the first traces on the trace region of the substrate comprises forming a first metal line layer on said substrate, and patterning the first metal layer to form said metal bridges and said first traces.

Meanwhile, said step of forming the plurality of inductive electrodes, the plurality of driving electrodes, and the second traces and the third traces corresponding to positions of the first traces, on said insulating layer, comprises forming a second metal layer on said insulating layer, patterning said second metal layer to form said inductive electrodes, the driving electrodes, the second traces and the third traces; during the forming process, a part of the second metal layer that forms the inductive electrodes is full of interconnections of the first via holes with the metal bridges, another part of the second metal layer that forms the second traces and the third traces is full of interconnections of the second via holes with the first traces.

In the present invention, said touch control display screen, comprises a display screen module, and further comprises the aforementioned touch control panel, said touch control panel layer is overlaid above said display screen module.

In said touch control panel of the present invention, the trace layer of said trace region is disposed with two-layer metal traces insulated by the insulating layer and connected to each other through the via holes, beneficial to decrease impedances of peripheral trace region traces; at same time since the insulating layer protects the traces located under the insulating layer, it effectively reduces risks of the layer trace fracture etc. issues, thereby raising product durability.

BRIEF DESCRIPTION OF THE DRAWINGS

To clearly describe the structural characteristics and the beneficial effects of the present invention, the following description is detailed with accompanying figures and embodiments.

DETAILED DESCRIPTION OF PREFERRED EMBODIMENTS

The followings will incorporate the inventive embodiments with its drawings, for more clearly and completely describing the technical solution of the inventive embodiments, wherein the drawings are regarded as just an exemplar expression, which just represents schematic diagrams but can not be realized as limited to the present invention.

Figure 1:
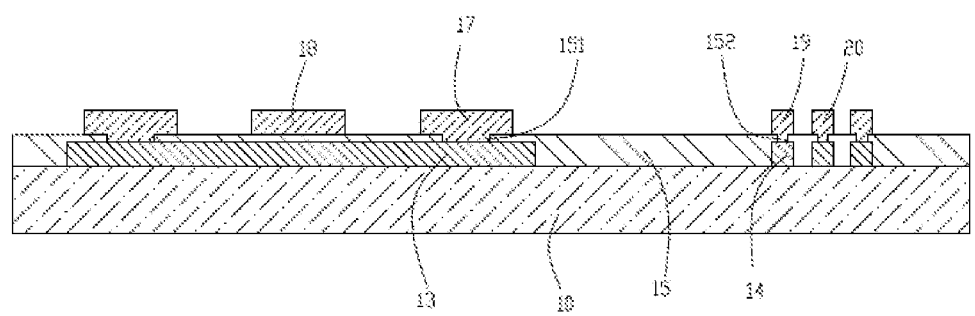
FIG. 1 depicts a cross-sectional schematic diagram of a touch control panel of the present invention.
Figure 2:
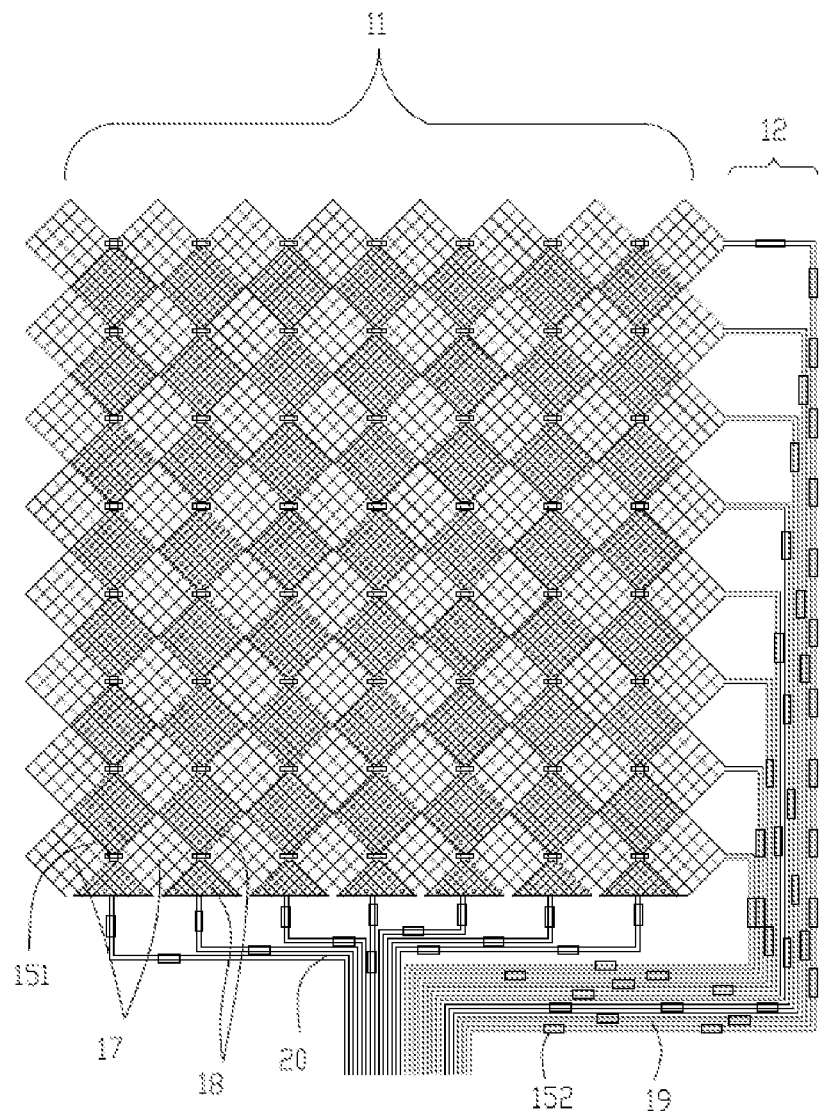
FIG. 2 depicts a top-view diagram of the touch control panel shown in FIG. 1.

Referring to FIG. 1 and FIG. 2, the present invention provides a touch control panel applied for touch-controlling an apparatus having a touch control display screen. Said touch control panel comprises a substrate 10 which is disposed thereon with a touch control region 11, and a trace region 12 located on an edge of the touch control region 11. Said substrate 10 is disposed thereon with metal bridges 13 located on said touch control region 11, and a plurality of first traces 14 located on said trace region 12, said substrate 10 is further formed thereon with an insulating layer 15 covering said metal bridges 13 and the first traces 14, said insulating layer 15 is disposed thereon with a plurality of first via holes 151 located on the touch control region 11, and is disposed thereon with second via holes 152 at positions corresponding to each of the first traces 14. Said insulating layer 15 is formed thereon with a metal layer (not shown), which comprises a plurality of inductive electrodes 17 and a plurality of driving electrodes 18 located on the touch control region 11, the inductive electrodes 17 are connected to second traces 19 located on the trace region 12, the driving electrodes 18 are connected to third traces 20 located on the trace region 12, said second traces 19 and the third traces 20 respectively correspond to positions of the first traces 14, and said second traces 19 and the third traces 20 all are connected to said corresponding first traces 14 through said second via holes 152, said plurality of inductive electrodes 17 are electrically connected to said metal bridges 13 through said plurality of first via holes 151.

In the embodiment, said plurality of inductive electrodes 17 are arranged in matrix, which can be regarded as disposed in multiple rows along X-axis direction. Said plurality of driving electrodes 18 are arranged in matrix, which can be regarded as disposed in multiple rows with along Y-axis direction, and said plurality of inductive electrodes 17 and a number of driving electrodes 18 are intersected and insulated with each other in distribution thereof. Each row of the inductive electrodes 17 along X-axis direction pass through the respective first via holes 151 for connection, and each row of the inductive electrodes are connected to one of said second traces 19. Each row of the driving electrodes 18 along Y-axis direction are connected to one of said third traces 20. Namely, a quantity of said plurality of first traces are identical with sum of quantities of the second traces and the third traces, and row number of the inductive electrodes are identical with the quantity of said second traces.

Each of said first via holes 151 is located between corresponding adjacent two of the inductive electrodes 17 separated apart from each other by said driving electrode 18; namely, said insulating layer 15 is disposed thereon with the first via holes 151 located at a position between each two of the inductive electrodes 17, along X-axis direction, separated apart from each other by the driving electrodes 18, which can be realized as intersecting positions of the inductive electrodes 17 and the driving electrodes. Said inductive electrodes 17 are connected to said metal bridges 13 through the first via holes 151, for accomplishing the electrical connections among a number of the inductive electrodes 17 in the same row along X-axis direction.

Connecting positions of said inductive electrodes 17 and said first via holes 151 can be a plane; namely, an external surface of said inductive electrode 17 is an universal plane, or connecting positions of said inductive electrodes 17 and said first via holes 151 are formed thereon with a concave in a direction toward said via holes, which is enough to just make connections of the inductive electrodes 17 with the metal bridges 13.

In the embodiment, said insulating layer 15 is intervally disposed thereon with a plurality of said second via holes 152 along an extending direction of each of said first traces 14; namely, each of the first traces 14 can be intervally disposed thereon with a plurality of second via holes 152, each of the second traces 19 is connected to the corresponding first trace 14 through the second via holes 152. Each of the third traces 20 is connected to the corresponding first trace 14 through the second via holes 152.

Namely, said second traces 19 and the corresponding first traces 14 are overlaid in a disposition of up-and-bottom layers, said third traces 20 and the corresponding first traces 14 are overlaid in a disposition of up-and-bottom layers, with insulating protections by the insulating layer and electrical interconnections through the via holes on therebetween. It means that the traces of the trace region are made in a dual-layer structure, for effectively decreasing impedances of the second traces 19 and the third traces 20 within the trace region while effectively reducing the risk of the layer trace fracture etc. issues since the insulating layer protects the first traces 14 located under the insulating layer, thereby raising product durability. Meanwhile, said first traces are employed for connecting a variety of electrodes electrically to a main control board.

Figure 3:
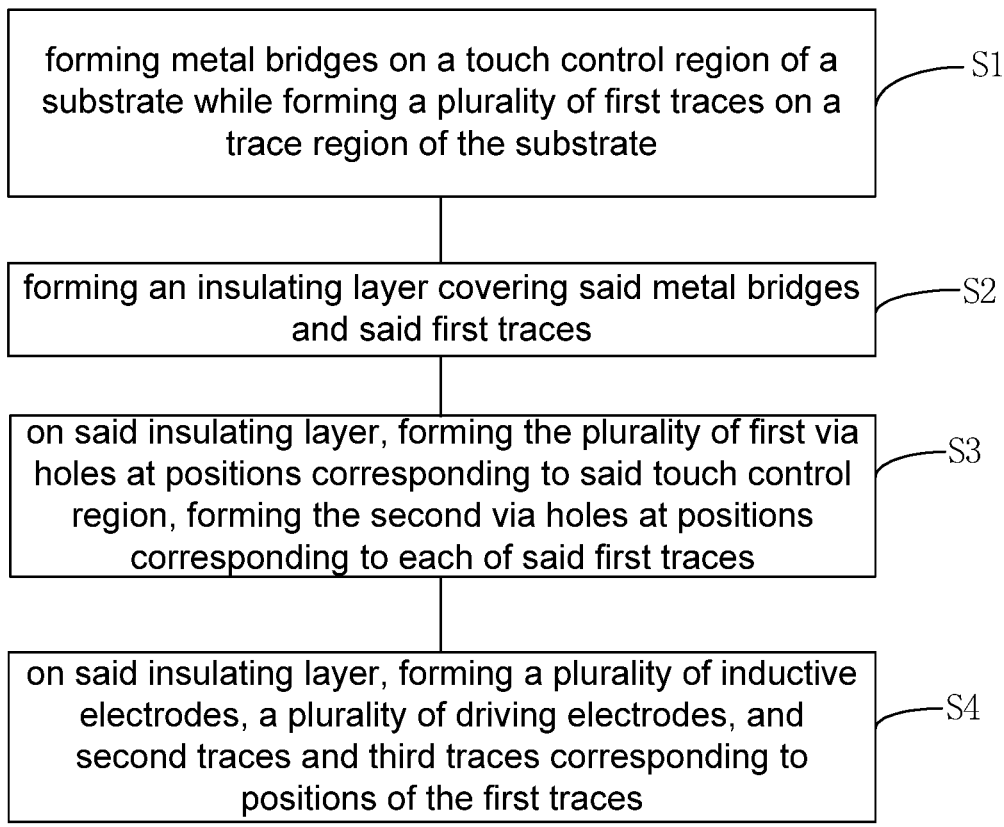
FIG. 3 depicts a flow chart of a fabricating method for the touch control panel of the present invention.

Referring to FIG. 1, FIG. 2 and FIG. 3, the present invention further provides a fabricating method for a touch control panel, which comprises:

step S1, forming metal bridges 13 on the touch control region 11 of the substrate 10 while forming the plurality of first traces 14 on the trace region 12 of the substrate 10; it primarily comprises step of forming a first metal line layer on said substrate 10, and patterning the first metal layer to form said metal bridges 13 and said first traces 14;

step S2, forming the insulating layer 15 covering said metal bridges 13 and said first traces 14 wherein said insulating layer completely covers the touch control region 11 and the trace region 12 of said substrate; said insulating layer 15 covering said first traces 14 provides said first traces 14 with a protection function for reducing the risk of the first trace fracture etc. issues;

step S3, on said insulating layer 15, forming the plurality of first via holes 151 at positions corresponding to said touch control region 11, forming the second via holes 152 at positions corresponding to each of said first traces 14, wherein a quantity of second via holes 20 on each of the first traces 14 is not limited, and preferably are plurality intervally disposed, thereby ensures a stable connection; and step S4, on said insulating layer 15, forming the plurality of inductive electrodes 17, the plurality of driving electrodes 18, and the second traces 19 and the third traces 20 corresponding to positions of the first traces 14; and making said inductive electrodes being connected to said metal bridges through the corresponding first via holes 151; connecting the second traces 19 and the third traces 20 to the corresponding first traces 14 through the second via holes 152, wherein this step comprises, forming the second metal layer on said insulating layer 15, and by mask and so forth, such as a patterning process, making said second metal layer to form said inductive electrodes, the driving electrodes, the second traces and the third traces. In the forming process, a part of the second metal layer that forms the inductive electrode 17 is full of the connections of the first via holes 151 with the metal bridges 13, and another part of the second metal layer that forms the second traces and the third traces is full of the connections of the second via holes 152 with the first traces 14.

The fabricating method for the touch control panel provides a condition without increasing fabricating step to form the dual-layer traces, decrease impedances of traces, and raise the stability for usage of the traces.

The present invention further provides a touch control display screen which comprises a display screen module and said touch control panel layer-overlaid above said display screen module.

As above mentioned, in accordance with technical embodiments and technical solution of the present invention, to any persons who are ordinary skilled in the art, other related change or variances can be made which should be covered by the protected scope of the subject claims attached below by the present invention.

What is claimed is:

1. A touch control panel, comprising a substrate which is disposed with a touch control region, and a trace region located on an edge of the touch control region, wherein said substrate is disposed thereon with metal bridges located on said touch control region and a plurality of first traces located on said trace region, said substrate is further formed thereon with an insulating layer covering said metal bridges and the first traces, said insulating layer is disposed with a plurality of first via holes located on a position of the touch control region, and second via holes are located at positions corresponding to each of the first traces, said insulating layer is formed thereon with a metal layer which comprises a plurality of inductive electrodes located on the touch control region, and a plurality of driving electrodes, the inductive electrodes are connected to second traces located on the trace region, the driving electrodes are connected to third traces located on the trace region, the second traces and the third traces are respectively correspond to positions of the first traces, and said second and third traces all are connected to said corresponding first traces through said second via holes, said plurality of inductive electrodes are electrically connected to said metal bridges through said plurality of first via holes;

wherein the metal bridges and the first traces are collectively formed as one and a same lower layer of conductivity that is formed on the substrate and covered with and protected by the insulating layer, and the plurality of inductive electrodes, the plurality of driving electrodes, and the second and third traces are collectively formed as one and a same upper layer of conductivity that is spaced from the substrate and the lower layer of conductivity by the insulating layer.

2. The touch control panel as claimed in claim 1, wherein a number of said second via holes are intervally disposed along an extending direction of each of said first traces on said insulating layer.

3. The touch control panel as claimed in claim 2, wherein each of said first via holes is located between corresponding adjacent two of the inductive electrodes which are separated apart from each other by said driving electrodes.

4. The touch control panel as claimed in claim 3, wherein said plurality of inductive electrodes are arranged in matrix, said plurality of driving electrodes are arranged in matrix, and said plurality of inductive electrodes and a number of the driving electrodes are intersected and insulated with each other in distribution thereof.

5. A fabricating method for a touch control panel, wherein said method comprises:

forming metal bridges on a touch control region of a substrate while forming a plurality of first traces on a trace region of the substrate;

forming an insulating layer covering said metal bridges and said first traces;

on said insulating layer, forming a plurality of first via holes at positions corresponding to said touch control region, forming second via holes at positions corresponding to each of said first traces; and on said insulating layer, forming a plurality of inductive electrodes, a plurality of driving electrodes, and second traces and third traces corresponding to positions of the first traces, and making said inductive electrodes being connected to said metal bridges through the corresponding first via holes; and connecting the second traces and the third traces to the corresponding first traces through the second via holes;

wherein the metal bridges and the first traces are collectively formed as one and a same lower layer of conductivity that is formed on the substrate and covered with and protected by the insulating layer, and the plurality of inductive electrodes, the plurality of driving electrodes, and the second and third traces are collectively formed as one and a same upper layer of conductivity that is spaced from the substrate and the lower layer of conductivity by the insulating layer.

6. The fabricating method for the touch control panel as claimed in claim 5, wherein said insulating layer is provided thereon with a number of said second via holes intervally disposed along an extending direction of each of said first traces.

7. The fabricating method for the touch control panel as claimed in claim 6, wherein each of said first via holes is formed between corresponding adjacent two of the inductive electrodes separated apart from each other by said driving electrode.

8. The fabricating method for the touch control panel as claimed in claim 5, wherein said step of forming the metal bridges on the touch control region of the substrate while forming the first traces on the trace region of the substrate comprises forming a first metal line layer on said substrate, and patterning the first metal layer to form said metal bridges and said first traces.

9. The fabricating method for the touch control panel as claimed in claim 5, wherein said step of forming the plurality of inductive electrodes, the plurality of driving electrodes, and the second traces and the third traces corresponding to positions of the first traces, on said insulating layer, comprises forming a second metal layer on said insulating layer, patterning said second metal layer to form said inductive electrodes, the driving electrodes, the second traces and the third traces; during the forming process, a part of the second metal layer that forms the inductive electrodes is full of interconnections of the first via holes with the metal bridges, another part of the second metal layer that forms the second traces and the third traces is full of interconnections of the second via holes with the first traces.

10. A touch control display screen comprising a display screen module, which further comprises a touch control panel, said touch control panel layer is overlaid above said display screen module, said touch control panel comprises a substrate which is disposed with a touch control region, and a trace region located on an edge of the touch control region, wherein said substrate is disposed thereon with metal bridges located on said touch control region and a plurality of first traces located on said trace region, said substrate is further formed thereon with an insulating layer covering said metal bridges and the first traces, said insulating layer is disposed with a plurality of first via holes located on a position of the touch control region, and second via holes are located at positions corresponding to each of the first traces, said insulating layer is formed thereon with a metal layer which comprises a plurality of inductive electrodes located on the touch control region, and a plurality of driving electrodes, the inductive electrodes are connected to the second traces located on the trace region, the driving electrodes are connected to third traces located on the trace region, the second traces and the third traces are respectively correspond to positions of the first traces, and said second and third traces all are connected to said corresponding first traces through said second via holes, said plurality of inductive electrodes are electrically connected to said metal bridges through said plurality of first via holes;

wherein the metal bridges and the first traces are collectively formed as one and a same lower layer of conductivity that is formed on the substrate and covered with and protected by the insulating layer, and the plurality of inductive electrodes, the plurality of driving electrodes, and the second and third traces are collectively formed as one and a same upper layer of conductivity that is spaced from the substrate and the lower layer of conductivity by the insulating layer.

11. The touch control display screen as claimed in claim 10, wherein a number of said second via holes are intervally disposed along an extending direction of each of said first traces on said insulating layer.

12. The touch control display screen as claimed in claim 11, wherein each of said first via holes is located between corresponding adjacent two of the inductive electrodes which are separated apart from each other by said driving electrode.

13. The touch control display screen as claimed in claim 12, wherein said plurality of inductive electrodes are arranged in matrix, said plurality of driving electrodes are arranged in matrix, and said plurality of inductive electrodes and a number of the driving electrodes are intersected and insulated with each other in distribution thereof.

\* \* \* \* \*